(12) United States Patent
Valdivia-Guerrero et al.

(10) Patent No.: US 10,199,161 B2
(45) Date of Patent: Feb. 5, 2019

(54) AUTOTRANSFORMER RECTIFIER UNIT

(71) Applicant: Goodrich Control Systems, Solihull, West Midlands (GB)

(72) Inventors: Virgilio Valdivia-Guerrero, Roquetas de Mar (ES); Daniel Diaz-Lopez, Cork (IE); Joshua Parkin, Solihull (GB)

(73) Assignee: GOODRICH CONTROL SYSTEMS, Solihull, West Midland (GB)

( * ) Notice: Subject to any disclaimer, the term of this patent is extended or adjusted under 35 U.S.C. 154(b) by 0 days.

(21) Appl. No.: 15/433,241

(22) Filed: Feb. 15, 2017

(65) Prior Publication Data

US 2017/0250023 A1    Aug. 31, 2017

(30) Foreign Application Priority Data

Feb. 15, 2016    (EP) .................................... 16155645

(51) Int. Cl.
| | |
|---|---|
| *H02M 7/06* | (2006.01) |
| *H01F 30/12* | (2006.01) |
| *B64D 47/00* | (2006.01) |
| *H01F 30/02* | (2006.01) |
| *H02M 7/08* | (2006.01) |

(52) U.S. Cl.
CPC ............. *H01F 30/12* (2013.01); *B64D 47/00* (2013.01); *H01F 30/02* (2013.01); *H02M 7/06* (2013.01); *H02M 7/068* (2013.01); *H02M 7/08* (2013.01)

(58) Field of Classification Search
CPC .. H02M 1/12; H02M 2001/123; H02M 1/126; H02M 7/06; H02M 7/068; H02M 7/08

USPC ........ 363/44, 48, 64, 67, 69, 87, 90, 91, 92, 363/93, 125, 126, 129, 130
See application file for complete search history.

(56) References Cited

U.S. PATENT DOCUMENTS

| | | | | |
|---|---|---|---|---|
| 3,958,173 A | * | 5/1976 | Christianson | .......... H02M 1/40 363/124 |
| 4,274,071 A | | 6/1981 | Pfarre | |
| 6,101,113 A | * | 8/2000 | Paice | ..................... H01F 30/12 363/126 |

(Continued)

FOREIGN PATENT DOCUMENTS

| | | |
|---|---|---|
| EP | 0430145 A1 | 6/1991 |
| EP | 1555745 A1 | 7/2005 |

OTHER PUBLICATIONS

Extended European Search Report for Application No. 16155645.1-1556, dated Aug. 2, 2016, 8 pages.

*Primary Examiner* — Alex Torres-Rivera
(74) *Attorney, Agent, or Firm* — Cantor Colburn LLP

(57) ABSTRACT

The present improvement essentially integrates a DC link inductance within an interphase power transformer (IPT). The integration is achieved by creating auxiliary magnetic paths for leakage inductance inside the IPT core. The magnetic path can be created, for example, by incorporating extra portions of magnetic material commonly referred to hereinafter as shunts. The IPT flux shared between windings does not cross these shunts. Therefore, this magnetic path increases the self-inductance of the IPT but does not contribute to the mutual inductance between windings. This extra magnetic path allows for leakage inductance of a much higher quantity than that achievable with a conventional IPT.

5 Claims, 4 Drawing Sheets

(56) References Cited

U.S. PATENT DOCUMENTS

| | | | |
|---|---|---|---|
| 6,385,064 B1* | 5/2002 | Zhou | H02M 7/08 |
| | | | 363/44 |
| 6,525,951 B1* | 2/2003 | Paice | H01F 30/14 |
| | | | 363/153 |
| 6,982,884 B1* | 1/2006 | Paice | H01F 30/02 |
| | | | 363/126 |
| 8,729,844 B2 | 5/2014 | Feng et al. | |
| 2006/0056207 A1 | 3/2006 | Sarlioglu | |
| 2010/0019874 A1 | 1/2010 | Melanson et al. | |
| 2013/0181643 A1* | 7/2013 | Feng | H02P 27/06 |
| | | | 318/400.3 |
| 2015/0228397 A1* | 8/2015 | Sorel | H01F 27/38 |
| | | | 363/64 |

* cited by examiner

Front view   Side view v1   Side view v2

6*n pulse IPT

AUTOTRANSFORMER RECTIFIER UNIT

FOREIGN PRIORITY

This application claims priority to European Patent Application No. 16155645.1 filed Feb. 15, 2016, the entire contents of which is incorporated herein by reference.

FIELD OF THE INVENTION

This disclosure relates to AC to DC converters and, specifically, autotransformer rectifier units (ATRUs) used in converting AC to DC.

BACKGROUND

Many loads connected to AC supplies require DC power and convert the AC power into DC power.

This is common, for example, in aircraft in which the aircraft is equipped with an internal 3-phase network. The frequency of the electric current over the power supply network can be variable.

In order to reliably power a load requiring a DC supply, an AC to DC converter is provided between the power supply network and the load.

It is necessary, particularly in aircraft to avoid or reduce harmonic currents generated by the conversion process and several solutions are available. Such solutions include passive filtering combined with 6-pulse rectification, active rectification, phase multiplication and the like. In particular, aircraft use multiphase conversion as this is known to be particularly reliable.

Aircraft AC to DC conversion systems often use a multiphase transformer, supplied from a 3-phase source and generating a multiphase AC supply for conversion into DC power.

Systems are known using a 12-pulse ATRU arrangement in which two rectifier converters are arranged in parallel.

As shown in FIG. 1, a 12-pulse ATRU comprises a primary winding 5 in a delta configuration and two secondary windings 7 in a star configuration. The primary winding 5 comprises windings 5a, 5b and 5c, while the two secondary windings 7 comprise windings 7a-7f.

The two secondary windings 7 are connected to two rectifier bridges 11 and 13 which operate in parallel and, to balance DC currents and avoid circulating currents, two interphase transformers 15 and 17 are required.

The ATRU 3 converts a 3-phase supply, e.g. the power supply on board an aircraft, as applied to conductors 9a, 9b and 9c into a first sub-supply 19 comprising conductors 19a, 19b and 19c and a second sub-supply 21 comprising conductors 21a, 21b and 21c. The sub-supplies are rectified by rectifier bridges 11 and 13. The outputs 11a, 11b, 13a and 13b from the rectifier bridges 11 and 13 are combined by the two interphase transformers or chokes 15 and 17. The converter provides a DC output voltage.

12-pulse rectifiers, commonly used in aircraft and aerospace applications are known to generate some total harmonic distortion.

In modern aircraft especially those with electric power systems operating over a wide frequency range but also with constant frequency systems, it is desirable to keep the level of total harmonic distortion low, and sometimes below that generally achievable with 12-pulse systems. An 18-pulse or more system can reduce harmonic distortion, providing a system with better power quality. An example of an 18-pulse converter can be found in U.S. Pat. No. 8,729,844.

Known ATRUs typically require the use of dedicated DC link chokes or inductors to smooth the output current, and thus contribute to reduction of harmonic distortion at the input, in order to meet required power quality standards. FIG. 2 shows an 18-pulse ATRU converter including dedicated DC link chokes (L5) connected in series with interphase power transformers (IPT1, IPT2). The rectified output provided by the ATRU is provided to the DC link filter 122 which includes a DC differential mode inductor L5 and capacitor C10 for smoothing the rectified output generated by the ATRU. This further reduces harmonics.

The DC link choke contributes to the total weight, size and the cost of the motor drive system.

The aim of the present disclosure is to reduce or eliminate the need for a dedicated DC link choke for 18 pulse ATRU, and ATRUs with higher number of pulses, without compromising reliability or cost.

SUMMARY

The inventions of the disclosure solve this problem by providing means to generate additional magnetic leakage inductance of the interphase power transformers.

The invention provides an interphase transformer comprising a core defining three or more limbs and a winding provided around each limb; characterised by means incorporated in said core so as to create auxiliary magnetic paths for flux generated by at least one of the windings, so that the magnetic flux not shared with other windings is circulated through the auxiliary magnetic path, thus integrating smoothing choke effect.

In embodiments, the means for creating auxiliary magnetic paths may comprise a shunt of magnetic material provided between adjacent limbs, or an additional limb defined by the core between adjacent limbs with windings, the additional limb not having a winding; the additional limb interrupted by an air gap, or an additional number of turns in one or more of the windings or limbs of magnetic material formed external and adjacent the core.

The interphase power transformer may be provided in a system for converting AC electric power to DC electric power comprising an n×6 pulse autotransformer, where n is an integer of 3 or more, n rectifier bridges and two interphase transformers comprising n limbs with windings therearound.

BRIEF DESCRIPTION OF THE DRAWINGS

Preferred embodiments will now be described by way of example only, with reference to the accompanying drawings.

DETAILED DESCRIPTION

One embodiment will be described in relation to an 18-pulse ATRU. The disclosure can also be implemented and provide advantages in relation to topologies with more than 18 pulses, e.g. 24-pulse systems.

Figure 2:
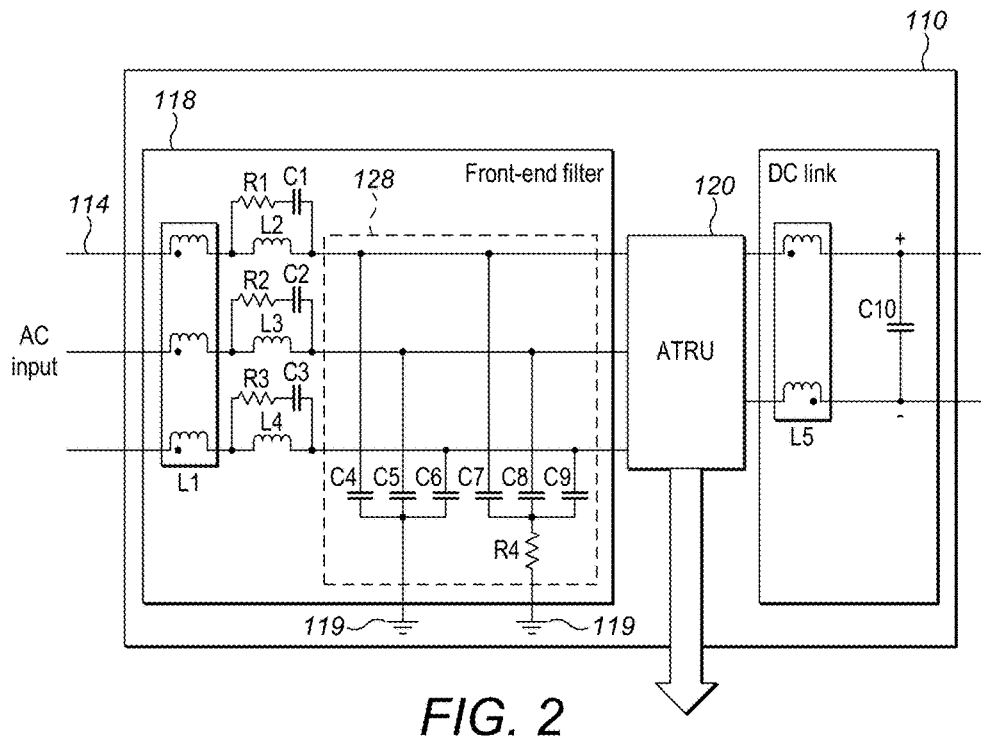
FIG. 2 is a circuit diagram of a known 18-pulse converter.
Figure 3:
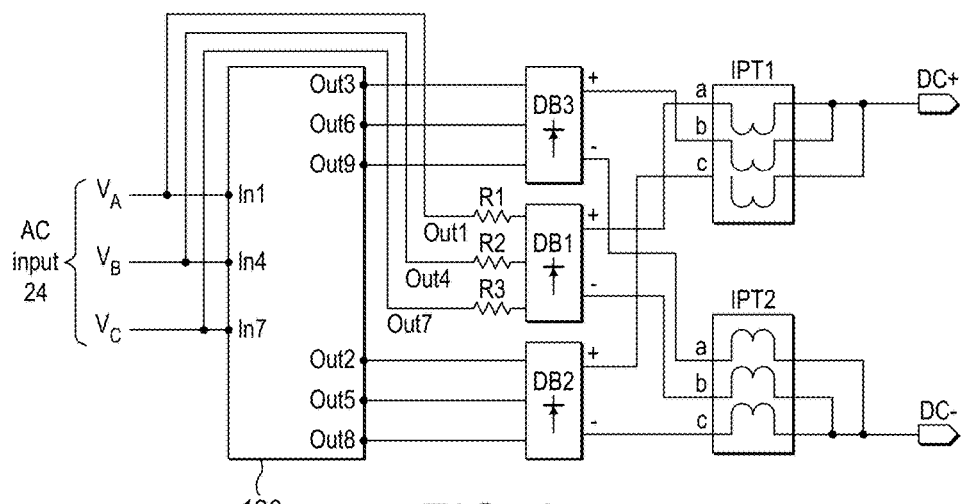
FIG. 3 is a circuit diagram of an 18-pulse ATRU.

FIG. 2 shows a conventional 18-pulse converter with an ATRU (shown in detail in FIG. 3).

Figure 1:
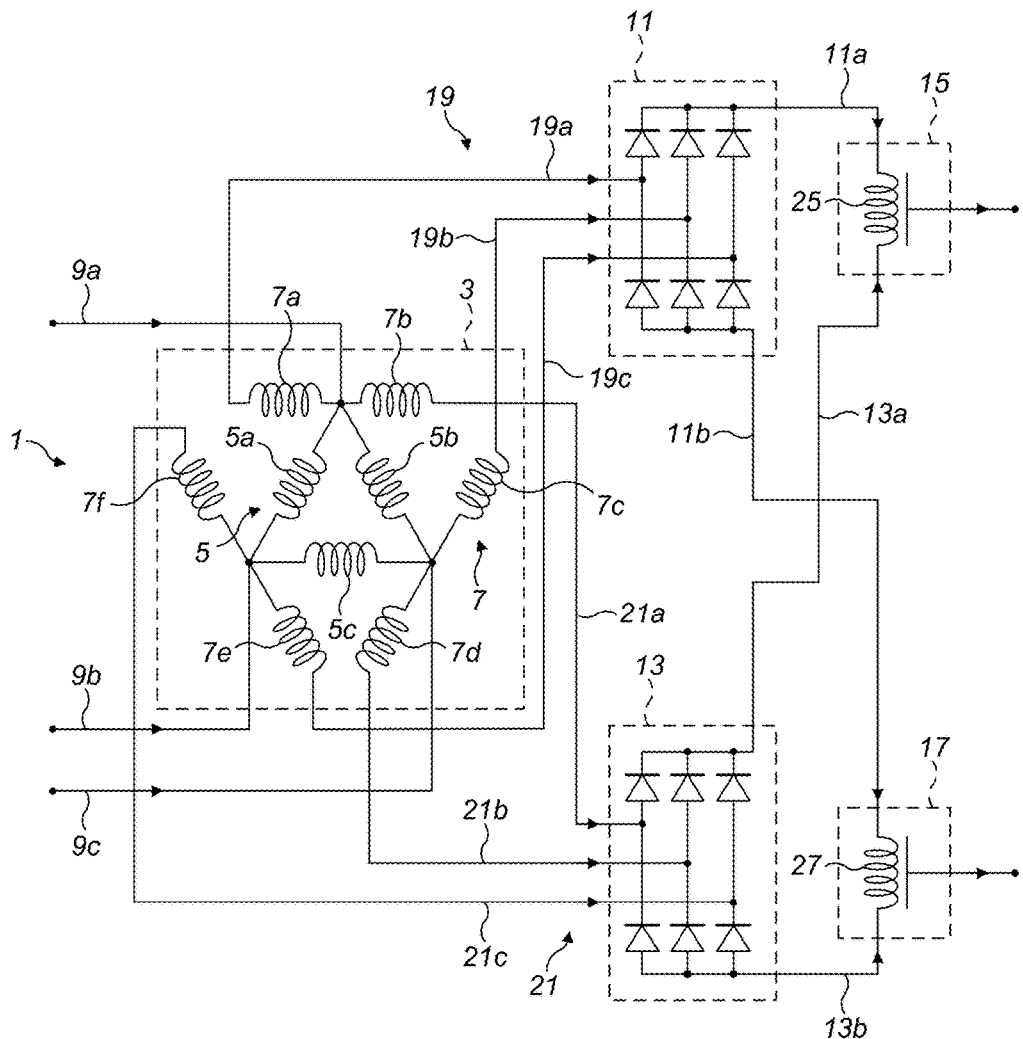
FIG. 1 is a circuit diagram showing a known 12-pulse ATRU.

In contrast to a 12-pulse system described above, and shown in FIG. 1, an 18-pulse system is comprised of three 6-pulse systems. As seen in FIG. 2, the power converter 110 includes front-end filter 118, autotransformer rectifier unit (ATRU) 120 and DC link filter 122.

The front-end filter 118 is as known in the art, such as described in U.S. Pat. No. 8,729,844 and will not be described in further detail. The inductors L2, L3, L4 and resistors R1, R2 and R3 with capacitors C1, C2 and C3 act to damp the filter. Filtering can prevent unwanted harmonics generated by ATRU 120 from being propagated to the power distribution network. This is just one example, other front-end filters are also suitable.

ATRU 120, shown in more detail in FIG. 3, converts the AC input provided by front-end filter 118 to a DC output via DC link filter 122.

ATRU 120 includes an asymmetrical phase shift autotransformer and a rectifier unit.

ATRU 20 includes 18-pulse autotransformer 130, diode bridge (DB) rectifiers DB1, DB2 and DB3, and interphase transformers IPT1 and IPT2.

Autotransformer 130 includes, in the example shown, first AC input terminals In1, In4 and In7. Each labelled input terminal represents a terminal connection point to the windings associated with autotransformer 130. The first AC input terminals In1, In4, In7 are connected directly to a first group of output terminals Out1, Out4, Out7 connected to resistors R1, R2 and R3. In this example, first AC input terminals In1, In4 and In7 are connected to receive AC power labelled VA, VB and VC, respectively. In an aircraft application, for example, this may be 230 volt AC power provided by an on-board generator. Of course, other autotransformer configurations may be used.

The output terminals Out3, Out6 and Out9 are connected to diode bridge DB3, output terminals Out2, Out5 and Out8 are connected to diode bridge DB2. Input terminals In1, In4 and In7 are connected to diode bridge DB1 via resistors R1, R2 and R3 in a configuration that bypasses autotransformer 130. Resistors R1, R2 and R3 are sized to match the resistance of windings associated with autotransformer 130 to balance output impedance of the outputs provided to the diode bridges DB1, DB2 and DB3.

The diode bridges convert the received AC input to a DC output having a positive component and a negative component. The positive DC output from each diode bridge is provided to interphase transformer IPT1 which provides an output that is combined to generate the positive DC output DC+. The negative DC output from each diode bridge is provided to the interphase transformer IPT2 which provides an output which is combined to generate the negative DC output DC−.

The IPTs provide parallel connection of the rectified output voltages and, for an 18-pulse system, each one comprises three windings 60. For higher order pulse systems, the IPTs will have more windings (i.e. for n×6-pulse systems, the IPTs have n windings). Generally speaking, an IPT comprises a magnetic core 50 which defines a number (n) of legs or limbs N1-Nn around each of which is provided an inductive winding 60.

The DC link 122, with DC inductor choke L5 serves to smooth the DC output voltage, as described above.

The present improvement essentially integrates a DC link inductance within an interphase power transformer (IPT).

The integration is achieved by creating auxiliary magnetic paths for leakage inductance inside the IPT core 50. The magnetic paths can be created, for example, by incorporating extra portions of magnetic material commonly referred to hereinafter as shunts. The IPT flux shared between windings 60 does not cross these shunts. Therefore, this magnetic path increases the self-inductance of the IPT but does not contribute to the mutual inductance between windings. This extra magnetic path allows for leakage inductance of a much higher quantity than that achievable with a conventional IPT.

Figure 5:
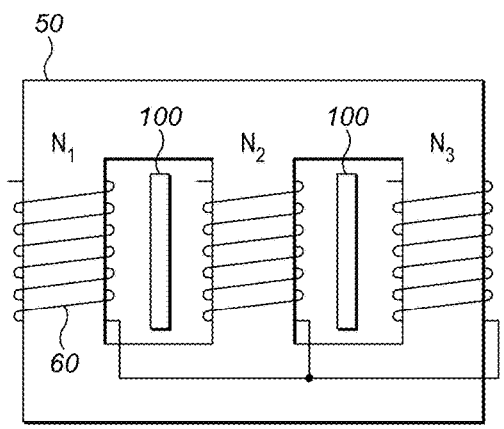
FIG. 5 shows the three windings of an IPT for an 18-pulse ATRU with shunts of magnetic material arranged between the core legs.

The additional magnetic leakage inductance can be realised as shown in FIG. 5, where shunts (100) or portions of magnetic material are provided between the wound core legs or limbs (N1, N2, N3) of the IPT.

Figure 6A:
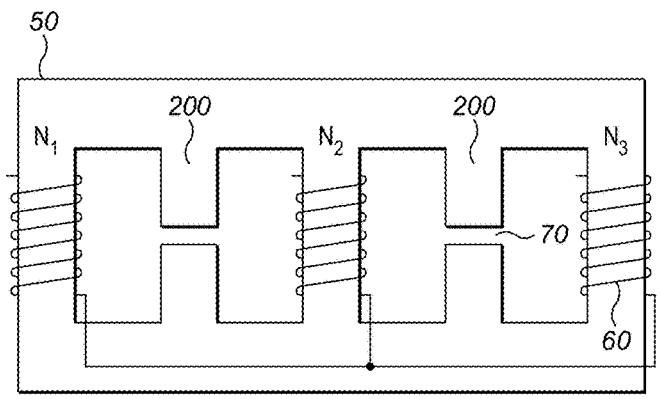
FIG. 6 shows the windings of an IPT for an 18-pulse ATRU with alternative ways of increasing leakage inductance according to the present disclosure.

Other ways of increasing the leakage inductance of the IPT are also envisaged and are within the scope of the disclosure. One such implementation is shown in FIG. 6A in which the IPT core 50 is provided or formed with additional gapped limbs (200), i.e. limbs without a winding but having an interruption 80 in the limb to form an air gap 70 along the length or across the limb, rather than shunts.

Figure 6B:
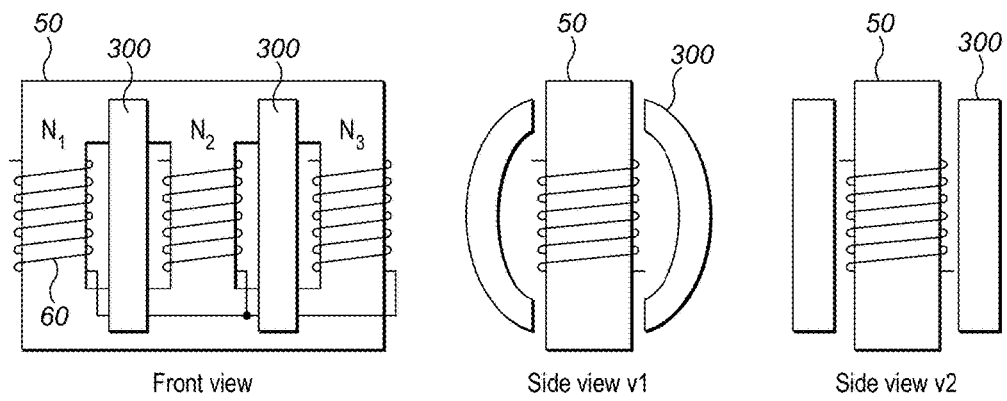

An alternative implementation is shown in FIG. 6B in which additional or external limbs (300) are mounted on or around the IPT core as a separate magnetic circuit to provide an auxiliary magnetic path that does not interfere with the path of the wound limbs of the IPT.

Figure 4:
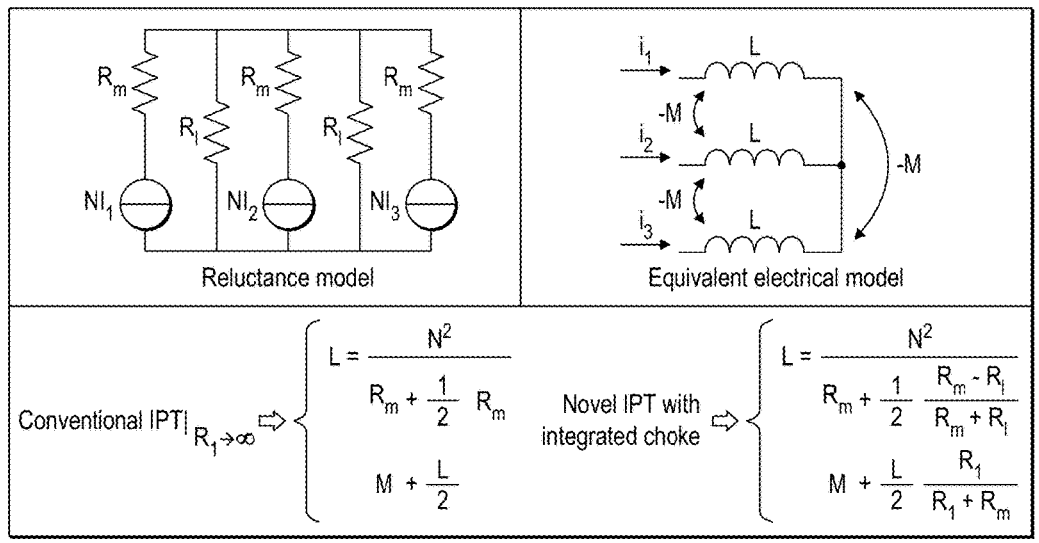
FIG. 4 shows the equivalent reluctance model, equivalent electrical model and design equations for an arrangement such as shown in FIG. 5.

Referring now to the equivalent circuits shown in FIG. 4, the equivalent reluctance circuit shows the core limbs represented by resistor Rm and reluctance of leakage paths created by the shunts represented by resistors Rl.

This is also represented in the equivalent electrical model. The equations at the bottom of FIG. 4 relate the reluctance model and the electrical model, where N is the number of turns per winding and i1, i2 and i3 are the currents on each winding.

As can be seen, adding magnetic shunts or auxiliary magnetic paths increases the self-inductance L and reduces the mutual inductance M, therefore increasing the difference L−2 M. This difference contributes to differential mode current filtering and, therefore, has the same effect as a conventional DC link choke.

The advantages of this concept can be achieved by integrating the DC link inductance with one IPT or several.

Figure 7:
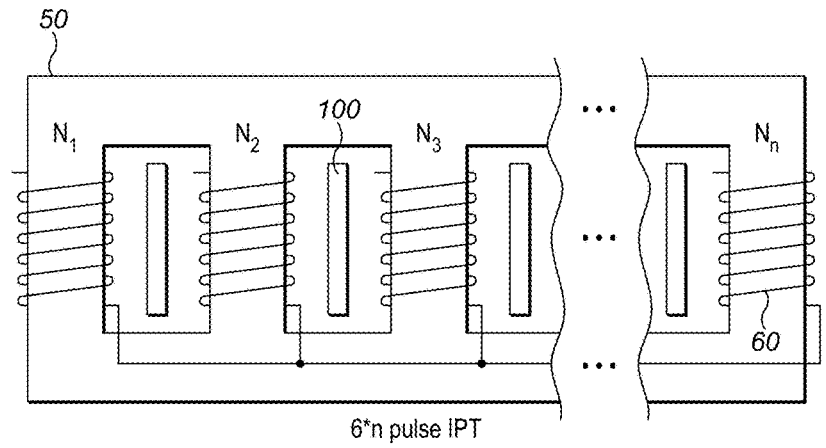
FIG. 7 shows IPT windings and how the concept could be applied to "greater than 18"-pulse systems.

As mentioned above, although the disclosure describes an 18-pulse system, the concepts equally apply to higher order systems e.g. 24-pulse, 30-pulse, 36-pulse systems. FIG. 7 illustrates an implementation of a solution for 6×n-pulse systems (where n is an integer of 3 or more), thus having n limbs $N_1$-$N_n$, each provided with a winding 60. FIG. 7 shows the inductance increased by shunts 100 (as in FIG. 5) but, again, there are other ways of providing increased leakage inductance, such as, for example, shown in FIGS. 6a and 6b).

The invention claimed is:

1. A system for converting AC electric power to DC electric power, the system comprising:
   an n×6 pulse autotransformer, where n is an integer of 3 or more;
   n rectifier bridges; and
   two interphase transformers (IPT1, IPT2) comprising n limbs with windings there around, at least a first one of said two interphase transformers being an interphase transformer comprising:
   a core defining three or more limbs; and
   a winding provided around each limb characterised by means incorporated in or on said core for creating auxiliary magnetic paths for flux generated by at least one of the windings, wherein the means for creating auxiliary magnetic paths comprises limbs of magnetic material formed external to and adjacent to the score.

2. The system of claim 1, wherein the means for creating auxiliary magnetic paths comprises a shunt of magnetic material provided between adjacent wound limbs.

3. The system of claim 1, wherein the means for creating auxiliary magnetic paths comprises an additional limb defined by the core between adjacent limbs with windings, the additional limb not having a winding; the additional limb interrupted by an air gap.

4. The system of claim 1, wherein the means for creating auxiliary magnetic paths comprises an additional number of turns in one or more of the windings.

5. The system of claim 1, wherein a second one of the at least two interphase transformers is an interphase transformer comprising:
 a core defining three or more limbs; and
 a winding provided around each limb characterised by means incorporated in or on said core for creating auxiliary magnetic paths for flux generated by at least one of the windings.

* * * * *